Patented July 7, 1931

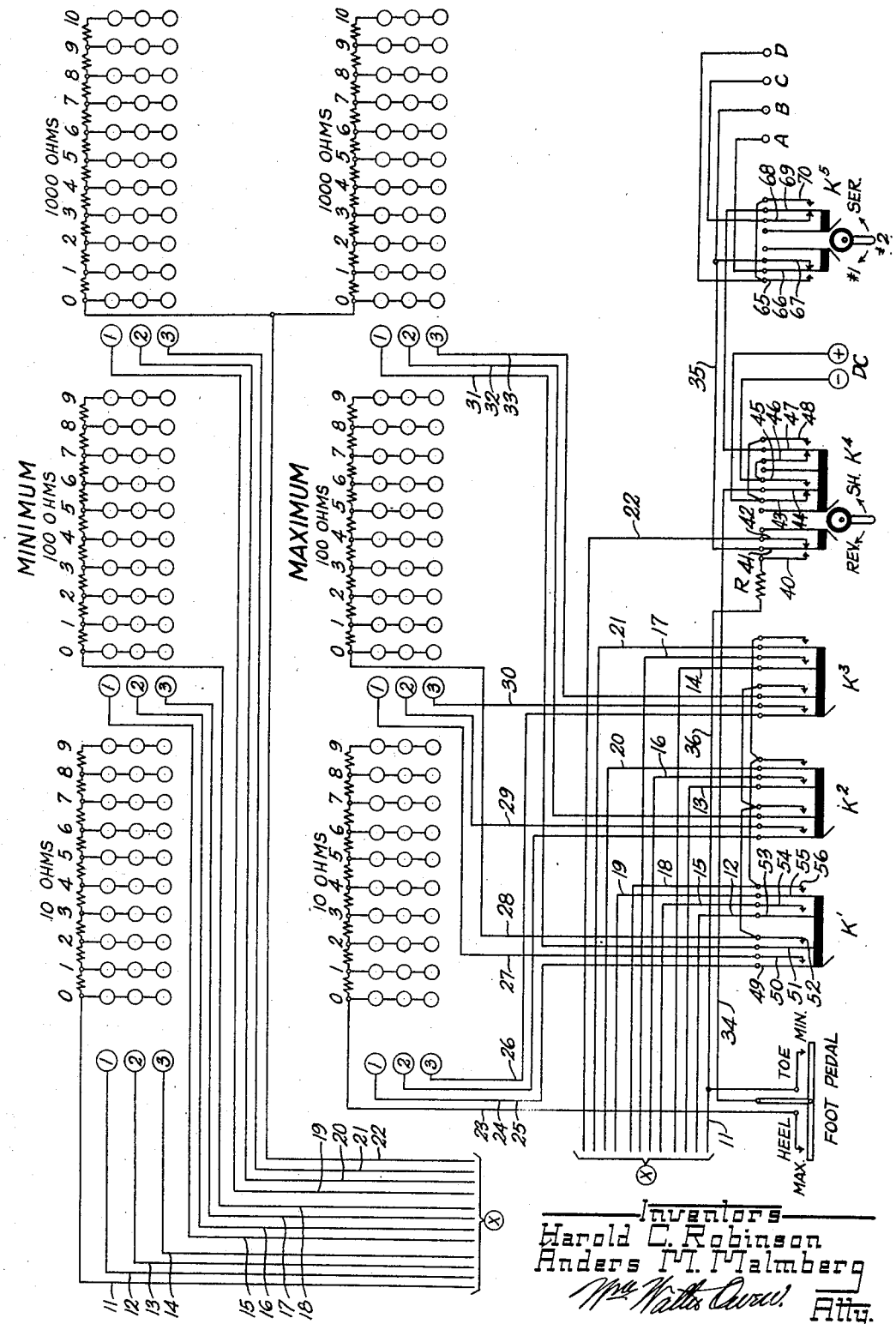

1,812,985

UNITED STATES PATENT OFFICE

HAROLD C. ROBINSON AND ANDERS M. MALMBERG, OF CHICAGO, ILLINOIS, ASSIGNORS TO RESERVE HOLDING COMPANY, OF CHICAGO, ILLINOIS, A CORPORATION OF DELAWARE

TESTING APPARATUS

Application filed May 2, 1929. Serial No. 359,784.

This invention relates, in general, to testing equipment, but it more particularly concerns variable resistance test sets for use particularly by manufacturers in the adjustment of electro-magnetic relays employed in various types of automatic telephone equipment.

The principal object of this invention is the provision of such a test set which will greatly increase the speed at which numbers of relays requiring different adjustments may be adjusted with the least possible number of operations on the part of the adjuster.

In order that the utility and desirability of the present invention may be more fully appreciated, a short description of the equipment for adjusting relays and the manner of operation of that equipment necessary prior to this invention, will be given.

It was formerly the custom to use a variable resistance test set in which desired resistance ohmage was secured by the setting of a plurality of keys. Thus, when a relay was to be adjusted to operate within certain limits of current, it was first necessary to set the keys of the box to obtain the necessary amount of resistance to provide the relay with the maximum amount of current and when the relay had been adjusted to operate on that current, the keys were operated to obtain the necessary amount of resistance to provide the relay with the minimum amount of current so that the relay could be adjusted not to operate on that amount. When a large number of relays requiring similar adjustments or different adjustments came to one adjuster to be adjusted, a great many operations of the keys or "set-ups", were required to provide the proper amount of resistance for each adjustment.

With the present invention, when large numbers of relays requiring the same adjustments, or a few different adjustments, come to one adjuster, only one "set-up" is required to obtain the proper amounts of resistance. Thus the number of operations required of the adjuster are reduced to a minimum, and the number of relays which the adjuster can adjust in a given period of time is accordingly greatly increased.

Other objects of the invention not specifically pointed out herein, will be apparent from the detailed description which follows and from the accompanying single sheet of drawing.

Referring to the drawing, it will be noted that there are groups of resistance units designated "minimum" and "maximum". In those groups there are sub-groups which are comprised of individual resistance units. The sub-groups to the left are marked "10 ohms", those in the center "100 ohms", and those to the right "1000 ohms". That marking means that each of the individual resistance units of the left-hand groups are ten ohms each, those of the center sub-groups are one hundred ohms each, while those in the sub-groups to the right are one thousand ohms each.

Each sub-group is provided with three horizontal rows of contacts. The corresponding contacts of the rows are conductively connected together and connected to one end of the resistance units. In the ten ohm groups and the one hundred ohm groups there are ten columns of three contacts each, between each of which columns is interposed a resistance unit, making nine such units. In the one thousand ohm groups there are eleven columns of contacts and ten interposed resistance units. For each horizontal row of contacts of each group there is a contacter, which contacters are represented by the circles designated 1, 2 and 3, to the left of the groups. These contacters are movable into contacting relation with each contact of the row of the associated group.

The columns have been numbered from 0 to 9 and 0 to 10 to indicate the number of the resistance units included in the circuits after the contacters have been placed.

For the sake of convenience, an individual contact will be referred to as, for example, 5—2. This designation means the second contact of the column designated 5; that is, that contact in the "5" column accessible to the contacter 2.

The first row of each of the "minimum" groups and the first row of each of the "maximum" groups are used for one test, while the second rows and third rows are each used for other tests. Thus, limits for three tests can be secured with the equipment as shown. However, in actual practice five or more rows are generally used, but inasmuch as an understanding of the invention may be had with the number of rows shown, it was thought advisable not to show more rows in order that the drawing might be as uncomplicated as possible.

For each pair of rows, that is one row in the "minimum" group and the corresponding row of the "maximum" group, a key such as K', K² and K³ is provided. These keys are push button locking keys of the type that release when another one of the keys are depressed.

In the lower left hand corner is shown a "foot pedal" which is of the type having the sole centrally pivoted so that pressure exerted on the "toe" will close the right hand contacts while pressure exerted on the "heel" will close the left hand contacts.

The keys K⁴ and K⁵ are double throw keys which lock in all positions. The designations of the various positions of those keys will be explained later as the description progresses.

The terminals A, B, C and D comprise the contacts of a plug which grasp the terminals of the relay windings. In case of a relay which has two windings, A and C grasp the terminals of winding #2 and B and D grasp the terminals of winding #1.

A source of direct current is indicated at DC by the minus signs.

The conductors at the left of the drawing have been cut off. These conductors are joined as indicated by the circles with X's in them. The conductors merely turn at right angles without crossing so the left hand conductor is continued by the lower most conductor of the group after the turn. The corresponding conductors are numbered the same.

It will be assumed that an adjuster receives three large groups of relays, each group requiring different adjustments, but all relays of the same group requiring the same adjustment. It will also be assumed that the source of current, DC, is a 46 volt battery, the voltage of which remains constant, and that the relays of one group must be adjusted to operate on the current they will receive through a minimum resistance of 3760 ohms and to fail to operate on the current through a maximum resistance of 4860 ohms.

Accordingly, contacter #1 of 10 ohms sub-group of the "minimum" group will be set on contact 6—1, contacter #1 of the 100 ohms sub-group will be set on contact 7—1 and contactor #1 of the 1000 ohms sub-group will be set on contact 3—1. In the "maximum" group, the contacters #1 will be set on contacts 61—1, 8—1, and 4—1, respectively.

The contacters #2 of the "minimum" and "maximum" groups will be set according to the requirements of the second group of relays and the contacters #3 will correspondingly be set according to the specifications for the third lot of relays.

In setting the contacters as just indicated, it has been assumed that the relays are single wound relays. A two-winding relay is treated as two single-winding relays except that both windings may be tested without touching the plug comprising contacts A to D, while the plug must be connected to each single-winding relay separately.

The adjuster now connects the plug to the terminals of the relay winding, which relay, it will be assumed, is one to be adjusted according to the limits 3760–4860. If the contacts A and C are used, the key K⁵ will be left in the #2 winding position, or the position shown in the drawing. If the contacts B and D are used the key will be thrown to the left to the #1 winding position. That throwing of the key operates the right hand contacts without moving the left hand contacts. For sake of convenience it will be assumed that contacts A and C are used. Therefore, K⁵ will remain in #2 winding position.

As it is desired to use the first row of each of the "minimum" and "maximum" groups, the adjuster will depress key K' and then close the "toe" contacts of the "foot pedal". Those operations complete the following circuit: positive terminal of DC, contact springs 43 and 44 of key K⁴, conductor 34, "toe" contacts of "foot pedal," conductor 11, the first six resistance units of the 10 ohm group since the contactor #1 is set on contact 6—1, contact 6—1, contactor #1, conductor 12, contact springs 53 and 54 of key K', conductor 15, contacter #1 of the 100 ohm group, contact 7—1, the first seven resistance units in series, conductor 18, contact springs 56 and 55 of key K', conductor 19, contactor #1 of the 1000 ohm group, contact 3—1, the first three 1000 ohm resistance units in series, conductor 22, contact springs 42 and 41 of key K⁴, conductor 35, contact springs 67 and 66 of key K⁵, plug contact A, winding of relay, plug contact C. contact springs 68 and 69 of key K⁵, contact springs 47 and 46 of key key K⁴, to negative terminal of DC. Thus current from DC is fed through the 3760 ohms to the winding of the relay being adjusted. The adjuster now adjusts the relay to operate on the current received through the minimum resistance, and after so doing opens the "toe" contacts of the "foot pedal" and closes the "heel" contacts.

The closing of the "heel" contacts completes the following circuit: positive terminal of DC, contact springs 43 and 44 of key K⁴, conductor 34, "heel" contacts of "foot pedal", conductor 23, the first six, 10 ohm, resistance units of the maximum group in series, contact 6—1, contacter #1 of the 10 ohm group, conductor 24, contact springs 49 and 50 of key K', conductor 27, contacter #1 of the 100-ohm group, contact 8—1, the first eight 100-ohm resistance units in series, conductor 28, contact springs 52 and 51 of key K', conductor 31, contacter #1 of the 1000-ohm group, contact 4—1, the first four 1000-ohm resistance units in series, conductor 22, springs 42 and 41 of key K⁴, conductor 35, springs 67 and 66 of key K⁵, plug contact A, winding of relay, plug contact C, springs 68 and 69 of key K⁵, springs 47 and 46 of key K⁴, the negative terminal of DC. Thus current is fed to the winding of the relay through the maximum resistance of 4860 ohms and the adjuster will adjust the relay to fail to operate on the amount of current received through the maximum resistance.

The adjuster now operates key K⁴ to the "Rev" position. In this position, the right hand springs of that key are operated to reverse the direction of the current flow through the relay winding. By the operation of the "foot pedal" the adjuster can check the operations of the relay.

In order that the relay may be properly gauged, the key K⁴ is moved to the "SH" position and the "foot pedal" is operated to the "toe" position. In that position of key K⁴, the spring 41 is caused to disengage spring 42 and engage spring 40. This operation closes the following circuit: positive terminal of DC, contact springs 43 and 44 of key K⁴, conductor 34, "Toe" contacts of "foot pedal", conductor 36, resistance R, contact springs 40 and 41 of key K⁴, springs 67 and 66 of key K⁵, plug contact A, and thence through the relay winding to the negative terminal of DC as previously traced. Thus, as the resistance R has a very low ohmage value, current is fed to the relay winding through practically no resistance as is required for the gauging operation. The resistance R is provided to prevent the burning up of relay windings of low resistance values.

The adjuster is now ready to adjust another relay. If the next relay requires similar adjustments, the operations will be identical with those just performed. However, if the relay is one requiring adjustment between the limits set up on the second rows of contacts in the "minimum" and "maximum" groups, the adjuster will depress key K² which, as explained, restores key K' and prepares circuits similar to those prepared by K' only using the second rows of contacts. If the relay is to be adjusted within the third set of limits, the adjuster depresses key K³ thereby preparing circuits through the #3 contactors and the third rows of contacts.

If one group of the relays comprises relays having two windings, the procedure will be slightly different. In this case, the limits for winding #1 of the relays are set up on the first rows of contacts and the limits for winding #2 are set up on the second rows of contacts. The adjuster is adjusting the relay to operate with winding #1, operates key K⁵ to #1 position so that plug contacts B and D might be used, and then depresses key K'. The adjuster then proceeds as before.

When the relay has been properly adjusted for the #1 winding, the adjuster operates key K⁵ to position #2 and then depresses key K² and proceeds as before. When completed, he operates key K⁵ to the "Ser." position. In that position of key K⁵, the two windings of the relay are included in series and the relay is gauged by operating key K⁴ to the "SH" position to short circuit the "minimum" and "maximum" resistance units and include the low resistance unit R in series with the windings of the relay.

From the foregoing, it can readily be seen that the invention greatly increases the number of relays which an adjuster can handle in a given period of time for only one setting of the contacters is necessary for large quantities of relays requiring the same adjustments.

Having thus described our invention, what we consider new and desire to secure by Letters Patent is pointed out in the claims which follow.

What is claimed is:

1. In a relay testing device for testing a relay for operation between required limits, a common circuit including the coil of a relay and a source of current, a pair of branch circuits each including a variable resistance set to one of the limits of the coil, a tilting switch for switching from one limit to the other by including the respective branch in the common circuit, another pair of branch circuits each including a variable resistance set to other limits, and a key for causing said latter two branches to be included in the common circuit by the tilting switch in place of the first two branches.

2. In a relay testing device for testing a two-coil relay for operation between required limits, a common circuit including a source of current, a key for including either of said coils in said common circuit, a pair of branch circuits for each of said coils, each branch including a variable resistance set to one of the limits of the respective coil, means for preparing the pair of branches to be used, and a tilting switch for switching from one limit to the other by including the respective ones of the prepared pair of branch circuits in the common circuit.

3. In a relay testing device for testing a two-coil relay for operation between required limits, a common circuit including a source of current, a key for including either of said coils in said common circuit or including both of said coils in series therein, a pair of branch circuits for each of said coils, each branch including a variable resistance set to one of the limits of the respective coil, means for preparing the pair of branches to be used, a tilting switch for switching from one limit to the other by including the respective ones of the prepared pair of branch circuits in the common circuit, a single branch circuit including a fixed resistance, and means for causing the tilting switch to include said single branch in the common circuit when the two coils are included in series in the common circuit.

4. In a relay testing device for testing a plurality of types of relays for operation between required limits for each type, a common circuit including a source of current and having terminals to which the coil of a relay may be readily attached to be included in the common circuit, a pair of branch circuits for each type of relay, each branch including a variable resistance set to one of the limits of the respective type of relay, means for preparing the pair of branch circuits to be used, and a tilting switch for switching from one limit to the other by including the respective ones of the prepared pair of branch circuits in said common circuit.

5. In a relay testing device for testing a relay for operation in various circuits, a common circuit including a source of current and the coil of the relay under test, a plurality of branch circuits each including a variable resistance, means for preparing one of said branches for use, and means for including the prepared branch in said common circuit for testing the relay for operation in that circuit.

In witness whereof, I hereunto subscribe my name this 27th day of April, A. D. 1929.
HAROLD C. ROBINSON.

In witness whereof, I hereunto subscribe my name this 27th day of April, A. D. 1929.
ANDERS M. MALMBERG.